United States Patent
Honda et al.

(10) Patent No.: US 11,186,217 B2
(45) Date of Patent: Nov. 30, 2021

(54) MOBILITY AS A SERVICE (MAAS) WITH MODULAR INTERIORS

(71) Applicant: Honda Motor Co., Ltd., Tokyo (JP)

(72) Inventors: Geoffrey Woo Honda, Torrance, CA (US); James Marion Cournyer, Newport Beach, CA (US); Fong Loon Pan, Torrance, CA (US); Craig Mitchell, Huntington Beach, CA (US); Shinji Maeshiro, Cypress, CA (US); Christopher Tarchala, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 16/564,273

(22) Filed: Sep. 9, 2019

(65) Prior Publication Data
US 2021/0070216 A1   Mar. 11, 2021

(51) Int. Cl.
*B60P 3/42*      (2006.01)
*G05D 1/02*      (2020.01)
(Continued)

(52) U.S. Cl.
CPC .............. *B60P 3/42* (2013.01); *G05D 1/0088* (2013.01); *G05D 1/0212* (2013.01);
(Continued)

(58) Field of Classification Search
CPC ...... B60P 3/42; B60P 3/14; B60P 3/32; G05D 1/0088; G05D 1/0212; G05D 1/0287; G05D 2201/0212; G06Q 10/1093; G06Q 20/322
(Continued)

(56) References Cited

U.S. PATENT DOCUMENTS

| | | | |
|---|---|---|---|
| 9,340,126 B2 | 5/2016 | Cuddihy et al. | |
| 2017/0197678 A1* | 7/2017 | Scaringe | B60K 1/04 |

(Continued)

FOREIGN PATENT DOCUMENTS

GN    202810242    3/2013

OTHER PUBLICATIONS

Spaces on Wheels: Exploring a Driverless Future; https://space10.io/project/spaces-on-wheels-exploring-a-driverless-future/.

*Primary Examiner* — Paula L Schneider
(74) *Attorney, Agent, or Firm* — Rankin, Hill & Clark LLP

(57) ABSTRACT

Delivery of a modularly reconfigurable vehicle may include receiving a request for the modularly reconfigurable vehicle, including a desired configuration associated with the modularly reconfigurable vehicle and a location associated with the request. Delivery of a modularly reconfigurable vehicle may include identifying the modularly reconfigurable vehicle from a plurality of candidate modularly reconfigurable vehicles and a target reconfiguration station from a plurality of candidate reconfiguration stations, providing an instruction to the modularly reconfigurable vehicle to travel to the target reconfiguration station, upon the modularly reconfigurable vehicle reaching the target reconfiguration station, providing an instruction to reconfigure the modularly reconfigurable vehicle according to the desired configuration as a modularly reconfigured vehicle, and upon the modularly reconfigured vehicle being reconfigured according to the desired configuration, providing an instruction to the modularly reconfigured vehicle to travel to the location associated with the request.

20 Claims, 14 Drawing Sheets

(51) Int. Cl.
  *G05D 1/00* (2006.01)
  *G06Q 20/32* (2012.01)
  *G06Q 10/10* (2012.01)
  *B60P 3/32* (2006.01)
  *B60P 3/14* (2006.01)

(52) U.S. Cl.
  CPC ....... *G05D 1/0287* (2013.01); *G06Q 10/1093* (2013.01); *G06Q 20/322* (2013.01); *B60P 3/14* (2013.01); *B60P 3/32* (2013.01); *G05D 2201/0212* (2013.01)

(58) Field of Classification Search
  USPC .......................................................... 701/27
  See application file for complete search history.

(56) References Cited

U.S. PATENT DOCUMENTS

| | | | |
|---|---|---|---|
| 2019/0057342 A1 | 2/2019 | Ferguson et al. | |
| 2019/0204097 A1* | 7/2019 | Starns | G07C 5/0808 |
| 2020/0406866 A1* | 12/2020 | Asai | B60S 3/04 |

* cited by examiner

MOBILITY AS A SERVICE (MAAS) WITH MODULAR INTERIORS

BACKGROUND

Mobility-as-a-Service (MaaS) is a shift from personally-owned modes of transportation and towards mobility solutions that are consumed as a service. For example, this may be enabled by combining transportation services from public and private transportation providers through a unified gateway that creates and manages a trip, which users can pay for using a MaaS account. Users can pay per trip or a monthly fee for a subscription.

BRIEF DESCRIPTION

According to one aspect, a method for delivery of a modularly reconfigurable vehicle may include receiving a request for the modularly reconfigurable vehicle. The request may include a desired configuration associated with the modularly reconfigurable vehicle and a location associated with the request. The method may include identifying the modularly reconfigurable vehicle from a plurality of candidate modularly reconfigurable vehicles and a target reconfiguration station from a plurality of candidate reconfiguration stations, providing an instruction to the modularly reconfigurable vehicle to travel to the target reconfiguration station, upon the modularly reconfigurable vehicle reaching the target reconfiguration station, providing an instruction to reconfigure the modularly reconfigurable vehicle according to the desired configuration as a modularly reconfigured vehicle, and upon the modularly reconfigured vehicle being reconfigured according to the desired configuration, providing an instruction to the modularly reconfigured vehicle to travel to the location associated with the request.

The method may include upon the modularly reconfigured vehicle arriving at the location associated with the request, providing an instruction to a second modularly reconfigurable vehicle at the location associated with the request to travel to a predetermined location. The method may include upon the modularly reconfigurable vehicle reaching the target reconfiguration station, reconfiguring the modularly reconfigurable vehicle according to the desired configuration as the modularly reconfigured vehicle.

The method may include determining the location associated with the request, identifying a current configuration associated with each of the plurality of candidate modularly reconfigurable vehicles, identifying the modularly reconfigurable vehicle from the plurality of candidate modularly reconfigurable vehicles based on a reconfiguration time associated with reconfiguring the modularly reconfigurable vehicle according to the desired configuration as the modularly reconfigured vehicle from a current configuration associated with respective plurality of candidate modularly reconfigurable vehicles, identifying the modularly reconfigurable vehicle from the plurality of candidate modularly reconfigurable vehicles based on a distance or a travel time from a current position of respective plurality of candidate modularly reconfigurable vehicles to the target reconfiguration station, or identifying the target reconfiguration station based on a distance or a travel time from respective candidate reconfiguration stations to the location associated with the request.

The method may include reconfiguring the modularly reconfigurable vehicle as the desired configuration includes reconfiguration using an office module, a camping module, a recreation or sports module, a power-sports module, a limo or shuttle module, an e-commerce module, a mobile charger exchange module, or a short stay or hotel module. In response to receiving the instruction to travel to the location associated with the request, the modularly reconfigured vehicle may autonomously navigate to the location associated with the request.

According to one aspect, a system for delivery of a modularly reconfigurable vehicle may include a processor. The processor may perform receiving a request for the modularly reconfigurable vehicle. The request may include a desired configuration associated with the modularly reconfigurable vehicle and a location associated with the request. The processor may perform identifying the modularly reconfigurable vehicle from a plurality of candidate modularly reconfigurable vehicles and a target reconfiguration station from a plurality of candidate reconfiguration stations, providing an instruction to the modularly reconfigurable vehicle to travel to the target reconfiguration station, upon the modularly reconfigurable vehicle reaching the target reconfiguration station, providing an instruction to reconfigure the modularly reconfigurable vehicle according to the desired configuration as a modularly reconfigured vehicle, and upon the modularly reconfigured vehicle being reconfigured according to the desired configuration, providing an instruction to the modularly reconfigured vehicle to travel to the location associated with the request.

The modularly reconfigurable vehicle may include a drive module, a shell module, and an interchangeable module. The interchangeable module may include an office module, a camping module, a recreation or sports module, a power-sports module, a limo or shuttle module, an e-commerce module, a mobile charger exchange module, or a short stay or hotel module. The drive module may include an autonomous drive controller autonomously navigating the modularly reconfigurable vehicle from a current position to the location associated with the request.

According to one aspect, a system for delivery of a modularly reconfigurable vehicle may include a processor. The processor may perform receiving a request for the modularly reconfigurable vehicle. The request may include a desired configuration associated with the modularly reconfigurable vehicle and a location associated with the request. The processor may perform identifying the modularly reconfigurable vehicle from a plurality of candidate modularly reconfigurable vehicles and a target reconfiguration station from a plurality of candidate reconfiguration stations, providing an instruction to the modularly reconfigurable vehicle to travel to the target reconfiguration station, upon the modularly reconfigurable vehicle reaching the target reconfiguration station, providing an instruction to reconfigure the modularly reconfigurable vehicle according to the desired configuration as a modularly reconfigured vehicle, upon the modularly reconfigured vehicle being reconfigured according to the desired configuration, providing an instruction to the modularly reconfigured vehicle to travel to the location associated with the request, and upon the modularly reconfigured vehicle arriving at the location associated with the request, providing an instruction to a second modularly reconfigurable vehicle at the location associated with the request to travel to a predetermined location.

The processor may determine the location associated with the request. The processor may receive a current configuration associated with each of the plurality of candidate modularly reconfigurable vehicles. The processor may identify the modularly reconfigurable vehicle from the plurality of candidate modularly reconfigurable vehicles based on a reconfiguration time associated with reconfiguring the modularly reconfigurable vehicle according to the desired configuration as the modularly reconfigured vehicle from a current configuration associated with respective plurality of candidate modularly reconfigurable vehicles. The processor may identify the modularly reconfigurable vehicle from the plurality of candidate modularly reconfigurable vehicles based on a distance or a travel time from a current position of respective plurality of candidate modularly reconfigurable vehicles to the target reconfiguration station. The processor may identify the target reconfiguration station based on a distance or a travel time from respective candidate reconfiguration stations to the location associated with the request.

DETAILED DESCRIPTION

Figure 1:
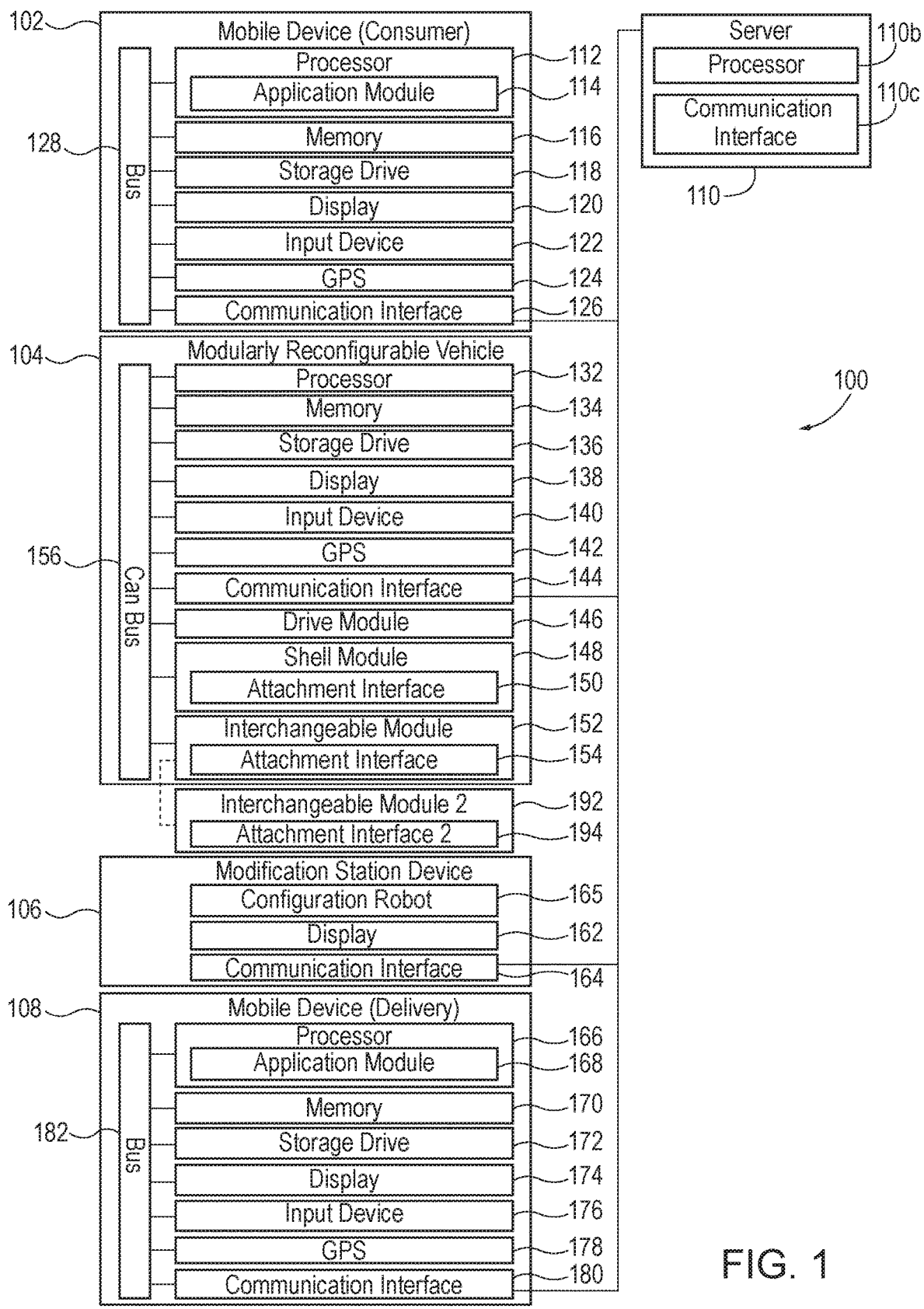
FIG. 1 is an illustration of an exemplary component diagram of a system for delivery of a modularly reconfigurable vehicle, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an illustration of an exemplary component diagram of a system 100 for delivery of a modularly reconfigurable vehicle, according to one aspect. The system 100 for delivery of the modularly reconfigurable vehicle may be implemented on a mobile device 102 or implemented on a modularly reconfigurable vehicle 104. The vehicle 104 (to be modified) may be delivered to a modification station and instructions on modification may be provided to a modification station device 106. According to one aspect, delivery of the modularly reconfigurable vehicle 104 may be facilitated by a human driver. Communication of delivery instructions may be provided by a second mobile device 108 to the human driver. In this regard, a server 110 may facilitate communication between the mobile device 102 (e.g., first mobile device), the modularly reconfigurable vehicle 104, the modification station and/or modification station device 106, and the second mobile device 108. The system 100 for delivery of the modularly reconfigurable vehicle may also be implemented on the server 110, according to one aspect.

As used herein, the modularly reconfigurable vehicle 104 may be a vehicle to be modified or a vehicle to be reconfigured which may be modified or reconfigured from a first configuration to a second configuration as the modified vehicle, modified according to a desired configuration, for example. The modification station may be a reconfiguration station or a station where reconfiguration and/or modification may be performed. For example, the modification station may be a vehicle dealership.

The mobile device 102 may include a processor 112, which may include an application module 114 for executing or running an application associated with delivery of the modularly reconfigurable vehicle 104 and/or reconfiguration of the modularly reconfigurable vehicle 104, such as for ordering or requesting the modularly reconfigurable vehicle 104. The mobile device 102 may include a memory 116, a storage drive 118, a display 120, an input device 122, a global positioning system (GPS) 124, a communication interface 126, and a bus 128. The application module 114 of the mobile device 102 or first mobile device may be utilized to run or execute an application which may be utilized to request the modularly reconfigurable vehicle 104 according to a user's desired specifications or desired configuration.

Similarly, the vehicle 104 may be utilized to implement the system 100 for delivery of the modularly reconfigurable vehicle. In this regard, the vehicle 104 may include a processor 132, which may be implemented via a controller, a memory 134, a storage drive 136, a display 138, an input device 140, a GPS 142 for determining a position of the modularly reconfigurable vehicle 104, a communication interface 144, a drive module 146, a shell module 148 including an attachment interface 150, an interchangeable module 152 including an attachment interface 154, and a controller area network (CAN) bus 156. The modularly reconfigurable vehicle 104 may be manually driven or autonomously navigated to the modification station. According to one aspect, the request for a different modularly reconfigurable vehicle 104 or the request for the same vehicle to be modularly reconfigured according to the user's desired specifications may be placed directly from the vehicle 104.

At the modification station, the modularly reconfigurable vehicle 104 may be modularly reconfigured according to the desired configuration (e.g., from the first configuration to the second configuration). In other words, the interchangeable module 152 may be replaced with another interchangeable module 192 associated with attachment interface 194, for example. The modification station device 106 may include a display 162 and a communication interface 164.

The second mobile device 108 may include a processor 166, which may include an application module 168. The application module 168 of the second mobile device 108 may be utilized for executing or running the application associated with delivery of the modularly reconfigurable vehicle 104 and/or reconfiguration of the modularly reconfigurable vehicle 104, such as for providing delivery instructions associated with the modularly reconfigurable vehicle 104 (e.g., in scenarios where autonomous delivery is not utilized). The second mobile device 108 may include a memory 170, a storage drive 172, a display 174, an input device 176, a GPS 178, a communication interface 180, and a bus 182.

The second mobile device 108 may be utilized by an operator of a vehicle to deliver the modularly reconfigurable vehicle 104 to a reconfiguration station or modification station or utilized by the operator of the vehicle to deliver the vehicle 104, before or after modification or reconfiguration, to a desired location. In this way, delivery of the modularly reconfigurable vehicle 104 may be provided where user selected or user configured modules may be ordered via a mobile application and inserted into the modularly reconfigurable vehicle 104. According to one aspect, the system 100 for delivery of the modularly reconfigurable vehicle may utilize form fit interchangeable modules 152, 192 which fit the interior of the vehicle 104. Further, the interchangeable modules 152, 192 may be pre-made or pre-configured so that they are quickly substituted for one another.

Explained yet another way, the system 100 for delivery of the modularly reconfigurable vehicle may enable a user to enroll in and/or utilize mobility as a service (MaaS), either with a vehicle owned by the user or with a vehicle subscription, to order different types or styles of MaaS vehicles outfitted with different interchangeable modules 192, including an attachment interface 194, or with different configurations and/or interiors. The modularly reconfigurable vehicle 104 may be outfitted with purpose built or custom interiors selected by the user based on or in accordance with parameters inputted to the mobile device 102. For example, the interiors may be selected online or using the application, and the user may be able to make an appointment for pickup or delivery.

The modularly reconfigurable vehicle 104 may be selected from any number of candidate vehicles to be modified and driven, either manually or autonomously, to a target modification or reconfiguration station (e.g., the vehicle dealership), and modified based on the parameters inputted to the mobile device 102. For example, the parameters or desired configuration may be passed from the server 110 to the communication interface 164 of the modification station device 106 via a communication interface 110*c*, and displayed on the display 162 for manual modification.

As previously discussed, the modularly reconfigurable vehicle 104 may include the drive module 146, which may be an engine for the vehicle 104, the shell module 148, and/or the interchangeable module(s) 152, 192. The drive module 146 may include an autonomous drive controller autonomously navigating the modularly reconfigurable vehicle 104 from a current position to the location associated with the request or to the target reconfiguration station or other programmed destination. The drive module 146 may be attached to the shell module 148, which may include the attachment interface 150. This attachment interface 150 of the shell module 148 may enable the interchangeable module 152 to be attached to the shell module 148 of the vehicle 104 via the attachment interface 154 of the interchangeable module. Any known means of attachment or fastening devices or mechanisms may be utilized.

According to one aspect, the interchangeable module 152 may be an office module, a camping module, a recreation or sports module, a power-sports module, a limo or shuttle module, an e-commerce or shopping module, a café module, an augmented reality (AR) module or a video game module, a healthcare module (e.g., for transporting medical teams or transporting patients), a mobile charger exchange module, or a short stay or hotel module. In this way, the modularly reconfigurable vehicle 104 may be reconfigured according to the desired configuration using one or more of the above-described modules. The application module 114 of the mobile device 102 may render a preview of one or more different types of the interchangeable modules on the display 120 of the mobile device 102. Additionally, the application module 114 of the mobile device 102 may present or render real time location data associated with a selected modularly reconfigurable vehicle (e.g., from the plurality of candidate modularly reconfigurable vehicles). In this way, the display 120 of the mobile device 102 may render information enabling the ordering user to determine the location of the modularly reconfigurable vehicles and/or a status associated with the modularly reconfigurable vehicle 104, such as whether the desired configuration is set or a percentage complete for the modification.

Once the vehicle is fully modified or reconfigured, the vehicle 104 may be picked up at the modification or reconfiguration station, or driven, either manually or autonomously, to the user. In this way, delivery of the modularly reconfigurable vehicle 104 may be provided.

A wide variety of variations may be implemented, according to one or more aspects. For example, any of the vehicles described herein may be driven manually or autonomously navigated from a first location or position to a second location or position. Further, any of the vehicles may travel a first portion of a route in a manually driven fashion and a second portion of the route in the autonomous navigation fashion or vice versa. According to one aspect, the user requesting the modularly reconfigurable vehicle 104 may outright own the modularly reconfigurable vehicle 104. According to another aspect, the user requesting the modularly reconfigurable vehicle 104 may merely be a subscriber to a MaaS subscription.

According to one aspect, the user requesting the modularly reconfigurable vehicle 104 may have a first modularly reconfigurable vehicle present and the request for the modularly reconfigurable vehicle 104 may result in the first modularly reconfigurable vehicle being sent to the target reconfiguration station for reconfiguration and back to the user. According to another aspect, the user requesting the modularly reconfigurable vehicle 104 may have a second modularly reconfigurable vehicle present and the request for the modularly reconfigurable vehicle 104 may result in a first modularly reconfigurable vehicle being delivered to the user and the second modularly reconfigurable vehicle being sent to another location. According to yet another aspect, the user requesting the modularly reconfigurable vehicle 104 may have no modularly reconfigurable vehicle 104 present and the request for the modularly reconfigurable vehicle 104 may result in the first modularly reconfigurable vehicle being sent from a location not associated with the user to the target reconfiguration station for reconfiguration and then to the user, as will be described with reference to FIG. 8A-8D.

According to one aspect, the user may use the mobile device 102 to initiate the request for the modularly reconfigurable vehicle 104. The request may include a desired configuration associated with the modularly reconfigurable vehicle 104 and a location associated with the request or a location associated with the user. For example, the application module 114 of the processor 112 of the mobile device 102 may execute the application associated with delivery of the modularly reconfigurable vehicle 104, which may display, using the display 120, a user interface (e.g., illustrated and discussed in greater detail in FIG. 7, herein). The user interface may be rendered to provide the user with several different options for the desired configuration for the user. In other words, the user, may input, using the input device 122 (e.g., which may be a touch screen, keyboard, mouse, button, etc.), parameters associated with the ordering or the request for the modularly reconfigurable vehicle 104. Other parameters may also be received, such as a desired pickup or delivery time, a desired reconfiguration station, etc.

The GPS 124 of the mobile device 102 may determine the location associated with the request or the location associated with the mobile device 102 or the user and pass this information to the processor 112 via the bus 128. This location information and the parameters associated with the request for the modularly reconfigurable vehicle 104 may be stored within the memory 116 of the mobile device 102 or the storage drive 118 of the mobile device 102 via the bus 128. Further, the processor 112 of the mobile device 102 may determine whether an existing modularly reconfigurable vehicle (e.g., a second modularly reconfigurable vehicle) is in use by the user (i.e., the user has a modularly reconfigurable vehicle which is not configured according to his or her desired configuration). Another example of information which may be determined by the processor 112 of the mobile device 102 may include autonomous navigation capabilities of the second modularly reconfigurable vehicle. The communication interface 126 of the mobile device 102 may include an antenna and may transmit the location associated with the request, the location associated with the mobile device 102 or the user, the parameters associated with the request for the modularly reconfigurable vehicle 104, any presence information associated with the second modularly reconfigurable vehicle, and/or the autonomous navigation capabilities of the second modularly reconfigurable vehicle to the server 110, for example.

Although the above request is described in terms of the mobile device 102, the request for the modularly reconfigurable vehicle 104 may be placed directly from the modularly reconfigurable vehicle 104. According to one aspect, the modularly reconfigurable vehicle 104 may travel to the reconfiguration station and return to the user in a reconfigured state, as will be described with reference to FIG. 9A-9D. According to another aspect, a different vehicle may be reconfigured and sent to the user, as will be described with reference to FIG. 10A-10D.

The server 110 may include a processor 110*b* and may receive, from the communication interface 126 of the mobile device 102, the request for the modularly reconfigurable vehicle 104. The processor 110*b* of the server 110 may identify the modularly reconfigurable vehicle 104 from a plurality of candidate modularly reconfigurable vehicles and a target reconfiguration station from a plurality of candidate reconfiguration stations. The server 110 may also identify a current configuration associated with each of the plurality of candidate modularly reconfigurable vehicles. Based on the determined current configuration and the desired configuration for the user, selection of the modularly reconfigurable vehicle 104 from the plurality of candidate modularly reconfigurable vehicles may be performed by the processor 110*b* of the server 110. If one of the plurality of candidate modularly reconfigurable vehicles is already configured according to the desired configuration for the user, no reconfiguration may be required.

However, if none of the plurality of candidate modularly reconfigurable vehicles is configured according to the desired configuration for the user and/or are not close enough distance to the user, reconfiguration of one of the plurality of candidate modularly reconfigurable vehicles may be instructed or performed. According to one aspect, the processor 110*b* of the server 110 may identify the target reconfiguration station based on a distance or a travel time from respective candidate reconfiguration stations to the location associated with the request or the location of the user or mobile device. According to another aspect, the processor 110*b* of the server 110 may identify the modularly reconfigurable vehicle 104 from the plurality of candidate modularly reconfigurable vehicles based on a distance or a travel time from a current position of respective plurality of candidate modularly reconfigurable vehicles to the target reconfiguration station.

The processor 110*b* of the server 110 may consider factors other than the distance of the corresponding candidate modularly reconfigurable vehicle to a given reconfiguration station or to the user and/or whether the corresponding candidate modularly reconfigurable vehicle is configured in the desired configuration for the user. For example, the processor 110*b* of the server 110 may identify the modularly reconfigurable vehicle 104 from the plurality of candidate modularly reconfigurable vehicles based on a reconfiguration time and/or delivery time associated with reconfiguring the modularly reconfigurable vehicle 104 according to the desired configuration as the modularly reconfigured vehicle from a current configuration associated with respective plurality of candidate modularly reconfigurable vehicles.

In any event, once the modularly reconfigurable vehicle 104 is identified from the plurality of candidate modularly reconfigurable vehicles and the target reconfiguration station is identified from the plurality of candidate reconfiguration stations, the processor 110*b* of the server 110 may provide an instruction to the modularly reconfigurable vehicle 104 to travel to the target reconfiguration station. In this regard, according to the autonomous aspect, the communication interface 144 of the modularly reconfigurable vehicle 104 may receive the instruction to travel to the target reconfiguration station and autonomously navigate from a current position or location to the target reconfiguration station. Stated another way, in response to receiving the instruction to travel to the target reconfiguration station, the modularly reconfigured vehicle may autonomously navigate to the target reconfiguration station. Similarly, in response to receiving the instruction to travel to the location associated with the request, the modularly reconfigured vehicle may autonomously navigate to the location associated with the request.

According to the manual aspect, the communication interface 180 of the second mobile device 108 may receive the instruction to travel to the target reconfiguration station and the GPS 178 of the second mobile device 108 may generate navigation instructions or turn by turn instructions from a current position or location of the second mobile device 108 to the target reconfiguration station, thereby enabling an operator of the modularly reconfigurable vehicle 104 to transport or deliver the modularly reconfigurable vehicle 104 to the target reconfiguration station. In this way, providing the instruction to the modularly reconfigurable vehicle 104 to travel to the target reconfiguration station enables the selected modularly reconfigurable vehicle to either travel autonomously or be driven manually to the target reconfiguration station for reconfiguration according to the user's desired configuration.

Upon the modularly reconfigurable vehicle 104 reaching the target reconfiguration station, the processor 110*b* of the server 110 may provide an instruction to reconfigure the modularly reconfigurable vehicle 104 according to the desired configuration as a modularly reconfigured vehicle. The modification or reconfiguration station may receive these instructions to reconfigure the modularly reconfigurable vehicle 104 and reconfigure the modularly reconfigurable vehicle 104 according to the desired configuration as the modularly reconfigured vehicle (e.g., either manually or automatically, such as by using a configuration robot).

The modification station device 106 may include a configuration robot 165. The configuration robot 165 may move or reconfigure the interchangeable module 152 and the second interchangeable module 192, such as by securing one of the interchangeable module 152 or the second interchangeable module 192 to the shell module 148 based on the aforementioned request associated with the mobile device 102. In other words, if the modularly reconfigurable vehicle 104 is equipped or configured with the interchangeable module 152, the configuration robot 165 may remove the interchangeable module 152 from the shell module 148 such that the attachment interface 154 of the interchangeable module 152 is no longer attached to the attachment interface 150 of the shell module 148. The configuration robot 165 may proceed to attach the second interchangeable module 192 to the shell module 148 such that the attachment interface 194 of the second interchangeable module 192 is attached to the attachment interface 150 of the shell module 148.

According to one aspect, the configuration robot 165 may include a robotic arm which may perform the removal or the attachment associated with the different interchangeable modules 152, 192. Further, the configuration robot 165 may customize respective interchangeable modules 152, 192 on a case by case basis. For example, if the user of the mobile device 102 indicates, via the input device 122, that four seats are desired within a specific interchangeable module 152, 192 the robotic arm of the configuration robot 165 may configure the respective interchangeable module 152, 192 to include the number of desired seats, for example. This customization by the configuration robot 165 may be automatic and based on the request received at the mobile device 102.

After reconfiguration, the modularly reconfigured vehicle may be provided with an instruction, via the server 110, to travel to the location associated with the request or to the location associated with the requesting user and/or the mobile device 102. Stated another way, upon the modularly reconfigured vehicle being reconfigured according to the desired configuration, the processor 110b of the server 110 may provide the instruction to the modularly reconfigured vehicle 104 to travel to the location associated with the request.

Thus, the modularly reconfigured vehicle 104 (e.g., previously the vehicle to be modified) may be manually driven or autonomously navigated from the target reconfiguration station to the location associated with the request. In this way, the second mobile device 108 may receive the instruction to the modularly reconfigured vehicle to travel to the location associated with the request if the modularly reconfigured vehicle is being manually driven.

If the second modularly reconfigurable vehicle is already present near the user or associated with use, the processor 110b, upon the modularly reconfigured vehicle arriving at the location associated with the request, may provide an instruction to the second modularly reconfigurable vehicle at the location associated with the request to travel to a predetermined location. In other words, if the user has the second modularly reconfigurable vehicle on site present with him or her which is not configured according to his or her desired configuration, the second modularly reconfigurable vehicle may be instructed to leave or travel to the predetermined location once the ordered or requested modularly reconfigurable vehicle arrives or is delivered or once the request is placed or received, for example. The predetermined location may be any of the plurality of candidate reconfiguration stations or to a location which is associated with a higher historical demand for the current configuration associated with that second modularly reconfigurable vehicle.

Figure 2:
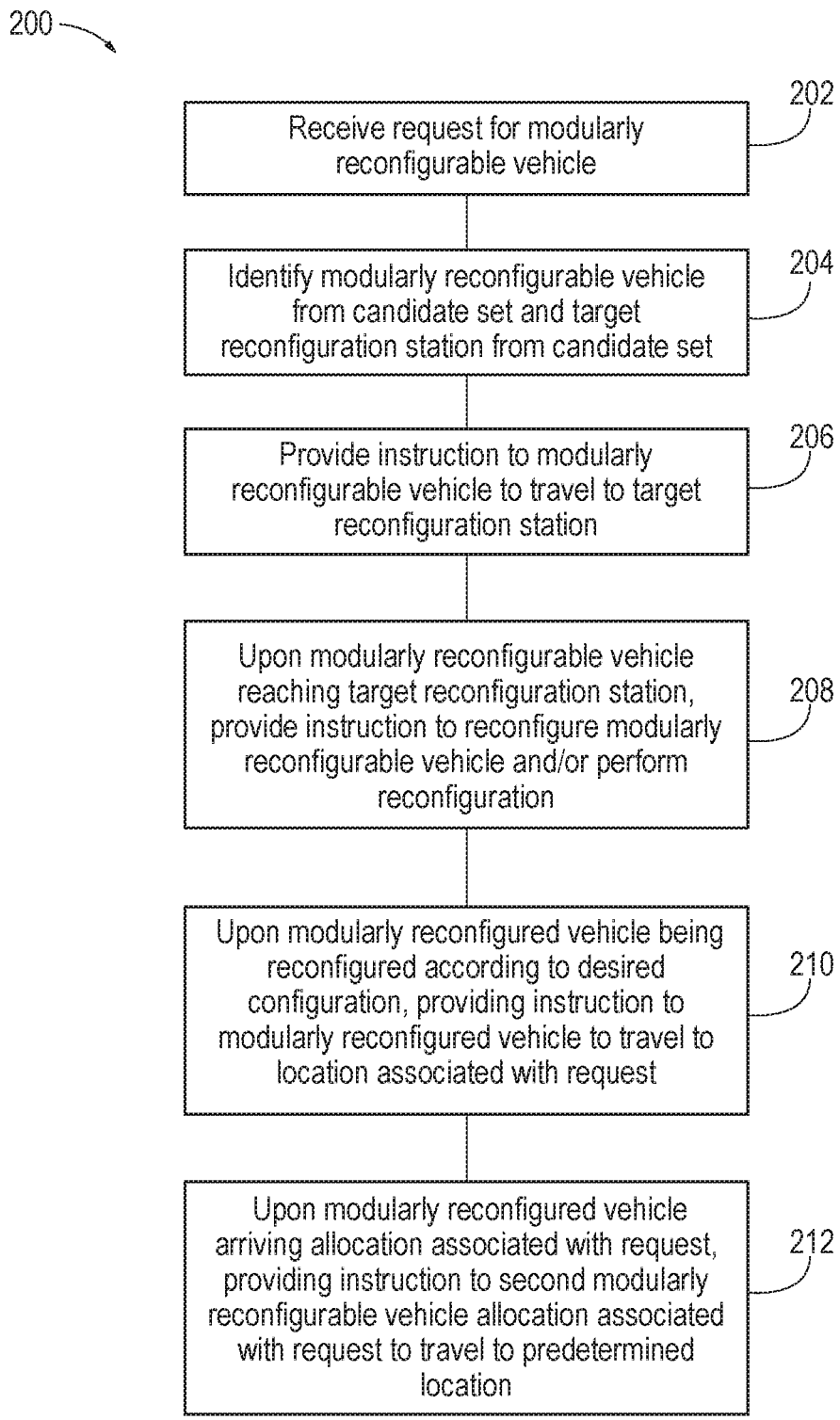
FIG. 2 is an illustration of an exemplary flow diagram of a method for delivery of a modularly reconfigurable vehicle, according to one aspect.

FIG. 2 is an illustration of an exemplary flow diagram of a method 200 for delivery of a modularly reconfigurable vehicle, according to one aspect. The method 200 for delivery of a modularly reconfigurable vehicle may include receiving 202 a request for the modularly reconfigurable vehicle. The request may include a desired configuration associated with the modularly reconfigurable vehicle and a location associated with the request. The method may include identifying 204 the modularly reconfigurable vehicle from the plurality of candidate modularly reconfigurable vehicles and a target reconfiguration station from a plurality of candidate reconfiguration stations, providing 206 an instruction to the modularly reconfigurable vehicle to travel to the target reconfiguration station, upon the modularly reconfigurable vehicle reaching the target reconfiguration station, providing 208 an instruction to reconfigure the modularly reconfigurable vehicle according to the desired configuration as a modularly reconfigured vehicle, upon the modularly reconfigured vehicle being reconfigured according to the desired configuration, and providing 210 an instruction to the modularly reconfigured vehicle to travel to the location associated with the request. The method 200 may also include upon the modularly reconfigured vehicle arriving at the location associated with the request, providing 212 an instruction to a second modularly reconfigurable vehicle at the location associated with the request to travel to a predetermined location. Any of the method 200, acts, or steps described herein may be performed in whole or in part via the processor 112 of the mobile device 102, the processor 132 of the modularly reconfigurable vehicle 104, the processor 166 of the second mobile device 108, or the processor 110b of the server 110, depending on the desired implementation.

In other words, although some acts, steps, or functions may be described herein with reference to the processor 112 of the mobile device 102, for example, it will be appreciated that the processor 132 of the modularly reconfigurable vehicle 104, or the processor 166 of the second mobile device 108, or the processor 110b of the server 110 may perform these acts, steps, or functions according to other aspects. As another example, although some acts, steps, or functions may be described herein with reference to the processor 110b of the server 110, it will be appreciated that the processor 132 of the modularly reconfigurable vehicle 104, or the processor 166 of the second mobile device 108, or the processor 112 of the mobile device 102 may perform these acts, steps, or functions according to other aspects.

Figure 3A:
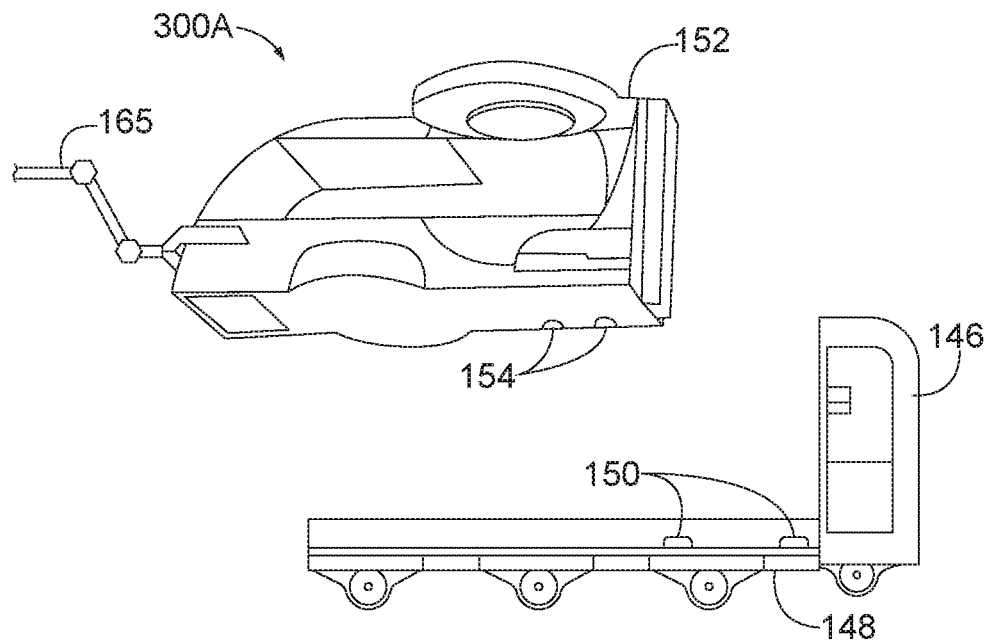
FIGS. 3A-3B are illustrations of an exemplary modularly reconfigurable vehicle, according to one aspect.
Figure 3B:
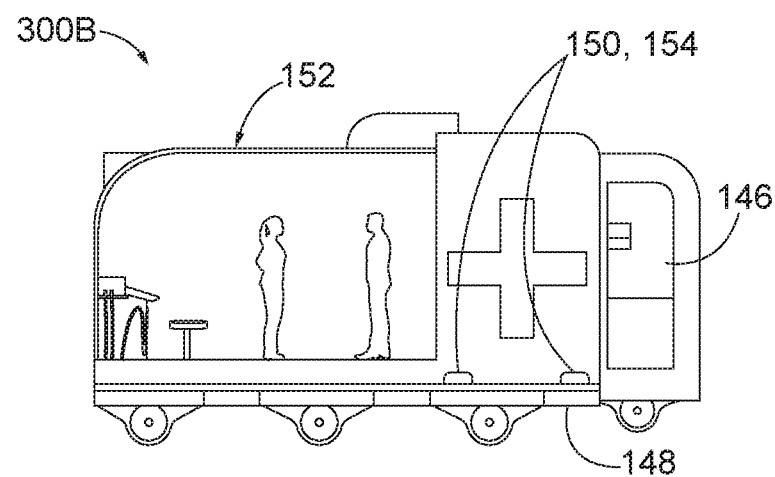

FIGS. 3A-3B are illustrations of an exemplary modularly reconfigurable vehicle, according to one aspect. In an implementation 300A of FIG. 3A, the drive module 146 can be seen as being attached to the shell module 148, which includes the shell module attachment interface 150. The interchangeable module 152, which is not yet attached or secured to the shell module 148, may include its own interchangeable module attachment interface 154. In an implementation 300B of FIG. 3B, it can be seen that the interchangeable module attachment interface 154 of the interchangeable module 152 is secured to the shell module attachment interface 150 of the shell module 148, thereby securing the interchangeable module 152 to the shell module 148 and the drive module 146 of the modularly reconfigurable vehicle. Other interchangeable modules, such as another interchangeable module 192 including its own associated attachment interface 194 may be swapped out for the interchangeable module 152 of FIGS. 3A-3B.

Figure 4:
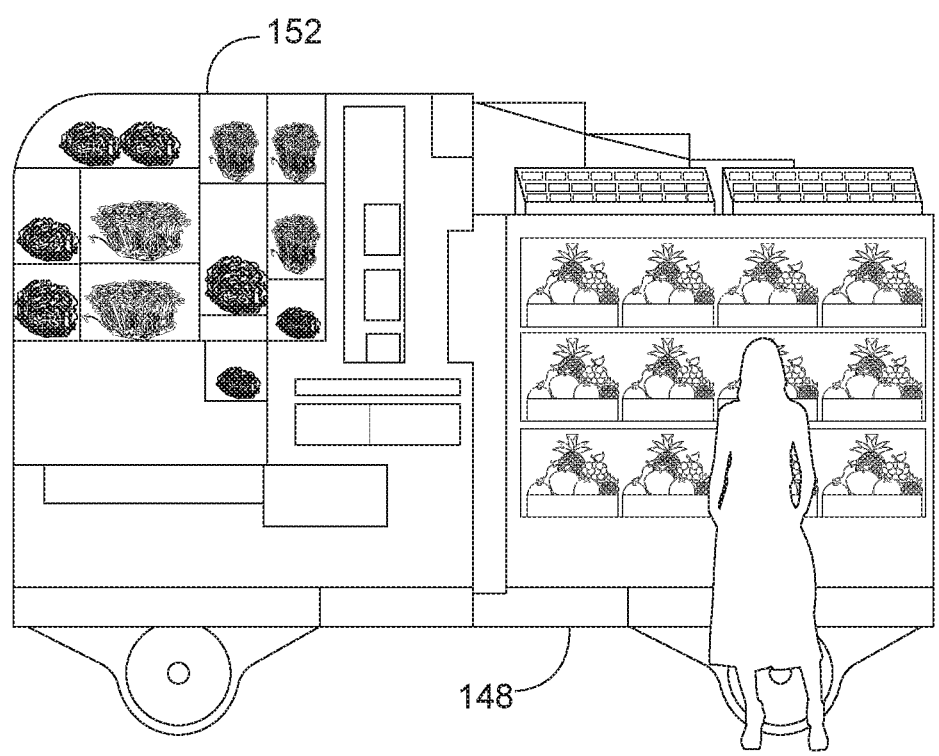
FIGS. 4-6 are illustrations of an exemplary modularly reconfigurable vehicle, according to one aspect.
Figure 5:
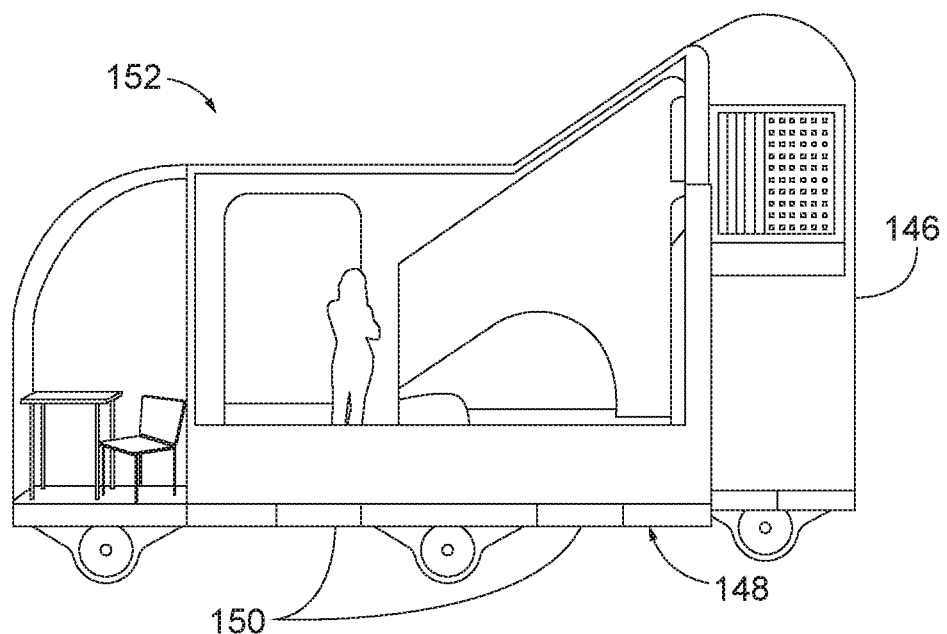
Figure 6:
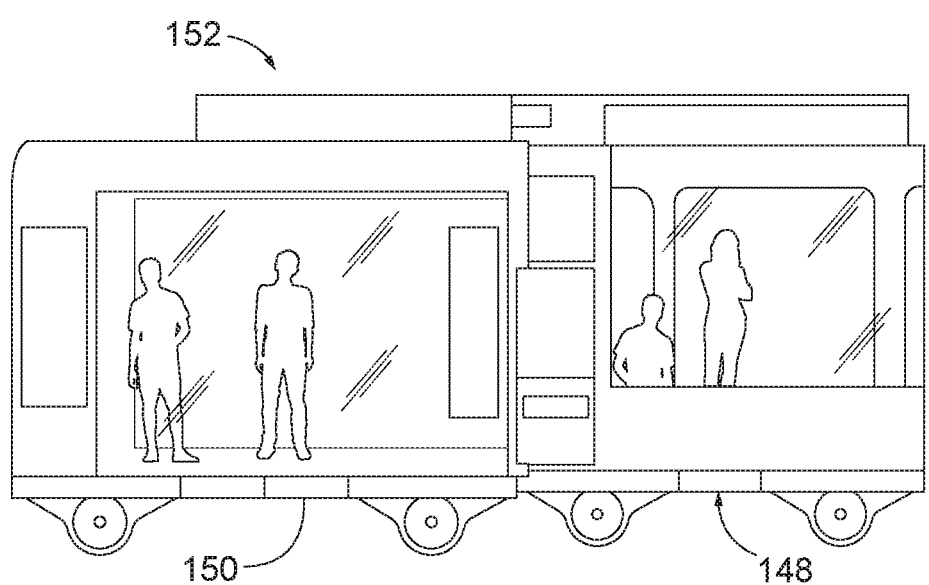

FIGS. 4-6 are illustrations of an exemplary modularly reconfigurable vehicle, according to one aspect. FIG. 4 is an illustration of an exemplary modularly reconfigurable vehicle including an e-commerce type interchangeable module 152 connected to the shell module 148, according to one aspect. FIG. 5 is an illustration of an exemplary modularly reconfigurable vehicle including an office type interchangeable module 152 connected to the shell module 148 and the drive module 146 via the shell module attachment interface 150. FIG. 6 is an illustration of an exemplary modularly reconfigurable vehicle including another office type interchangeable module 152 connected to the shell module 148 via the shell module attachment interface 150.

Figure 7:
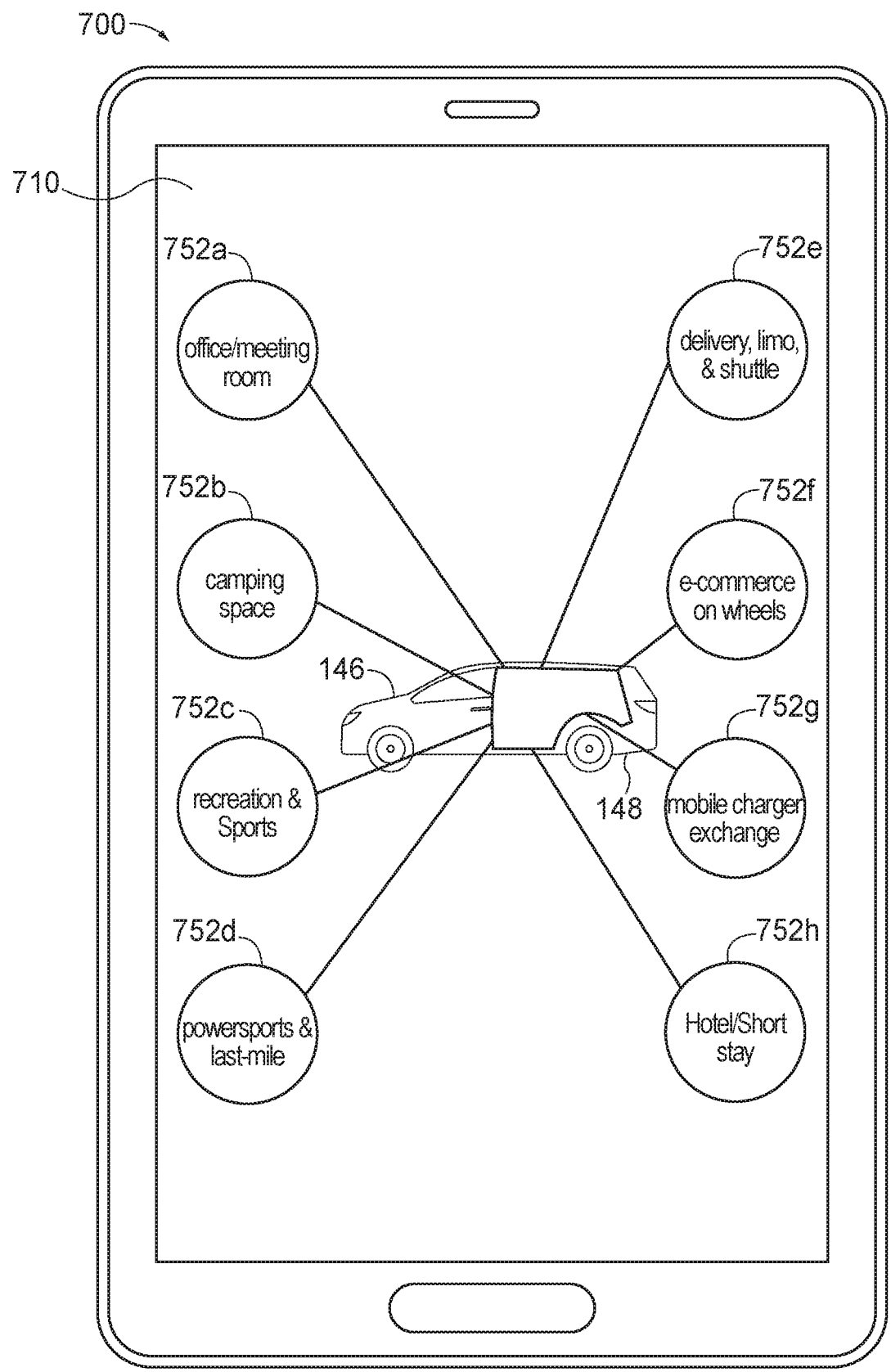
FIG. 7 is an illustration of an exemplary user interface associated with the system for delivery of the modularly reconfigurable vehicle of FIG. 1, according to one aspect.

FIG. 7 is an illustration of an exemplary user interface 700 associated with the system for delivery of the modularly reconfigurable vehicle of FIG. 1, according to one aspect. In FIG. 7, the user interface 700 may be rendered on a display 120, 174 of a mobile device 102, 108 via the application 710 associated with delivery of the modularly reconfigurable vehicle, illustrating the drive module 146 and the shell module 148, which may be outfitted with a variety of different interchangeable module options 752*a*, 752*b*, 752*c*, 752*d*, 752*e*, 752*f*, 752*g*, and 752*h*, which may be indicative of options for an office module, a camping module, a recreation module, a power-sports module, a shuttle module, an e-commerce module, a mobile-charger exchange module, and a hotel module, respectively. As seen in FIG. 7, an exemplary drive module 146 and shell module 148 are depicted, thereby enabling the ordering or requesting user to visually identify or preview the requested module prior to ordering or delivery. The application 710 may enable the user to preview 3D renderings of the different interiors of the respective modules.

Figure 8A:
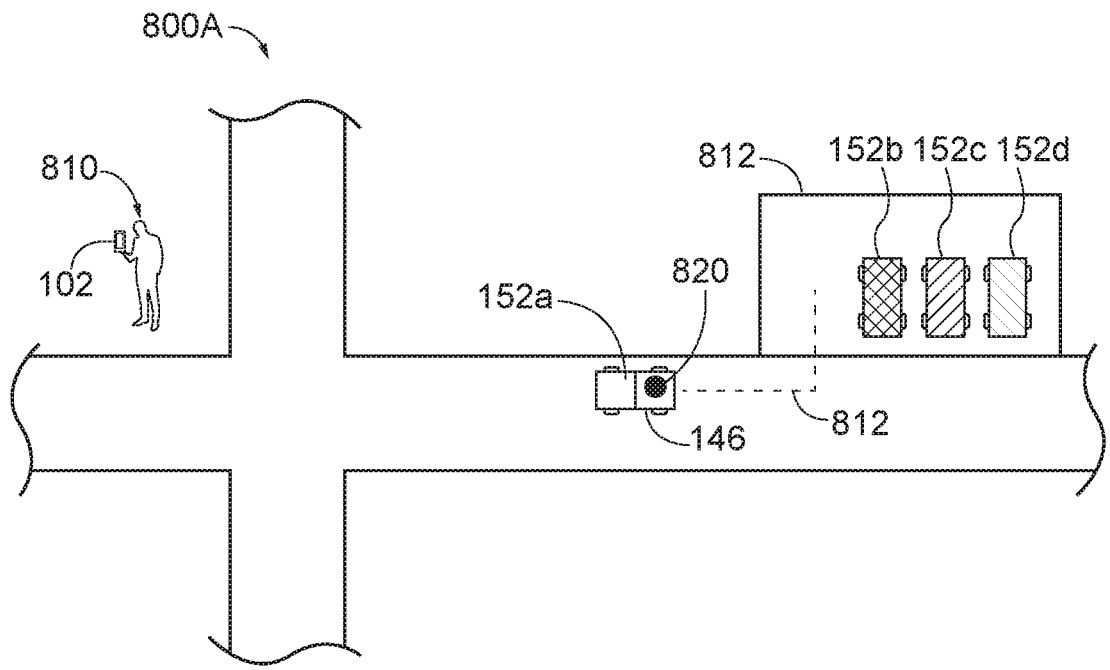
FIGS. 8A-8D are illustrations of exemplary scenarios associated with delivery of a modularly reconfigurable vehicle, according to one aspect.
Figure 8B:
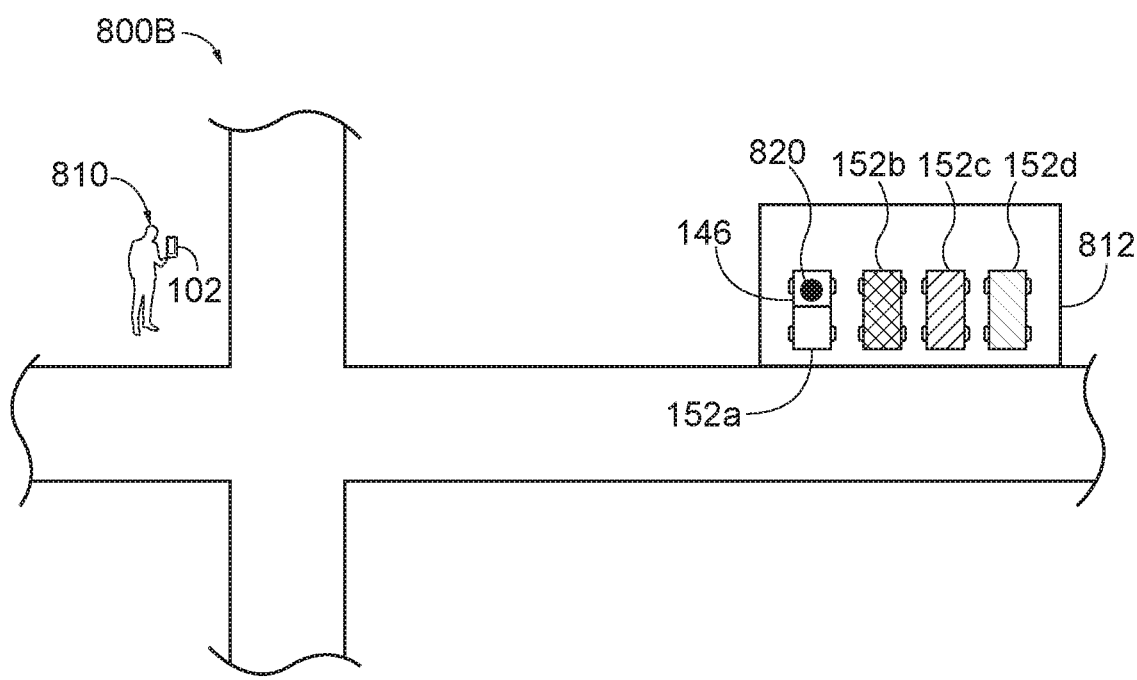

FIGS. 8A-8D are illustrations of exemplary scenarios 800A, 800B, 800C, 800D, respectively, associated with delivery of a modularly reconfigurable vehicle, according to one aspect. In FIG. 8A, a user 810 using the mobile device 102 running the application associated with delivery of the modularly reconfigurable vehicle may be utilized to initiate a request for modularly reconfigurable vehicle according to the specifications or desired configuration of the user 810. A modularly reconfigurable vehicle, selected from a plurality of candidate modularly reconfigurable vehicles, may include the drive module 146 or drive portion and a first interchangeable module 152*a* as a vehicle to be modified. In FIG. 8A, the user 810 has selected an interchangeable module from among a second interchangeable module 152*b*, a third interchangeable module 152*c*, and a fourth interchangeable module 152*d*. These modules are located at a target reconfiguration station 812 (e.g., selected from a plurality of candidate reconfiguration stations). According to the aspect depicted in FIG. 8A, a human driver 820, utilizing the second mobile device 108, may receive instructions or navigation instructions from the server 110 to travel from the current location to the target reconfiguration station 812. The human driver 820 may navigate to the target reconfiguration station 812 along a route 818 based on the instructions received from the second mobile device 108. In FIG. 8B, the human driver 820 has arrived at the target reconfiguration station 812, and reconfiguration of the modularly reconfigurable vehicle (including drive module 146) may be performed (e.g., manually or automatically by a reconfiguration system or robot).

Figure 8C:
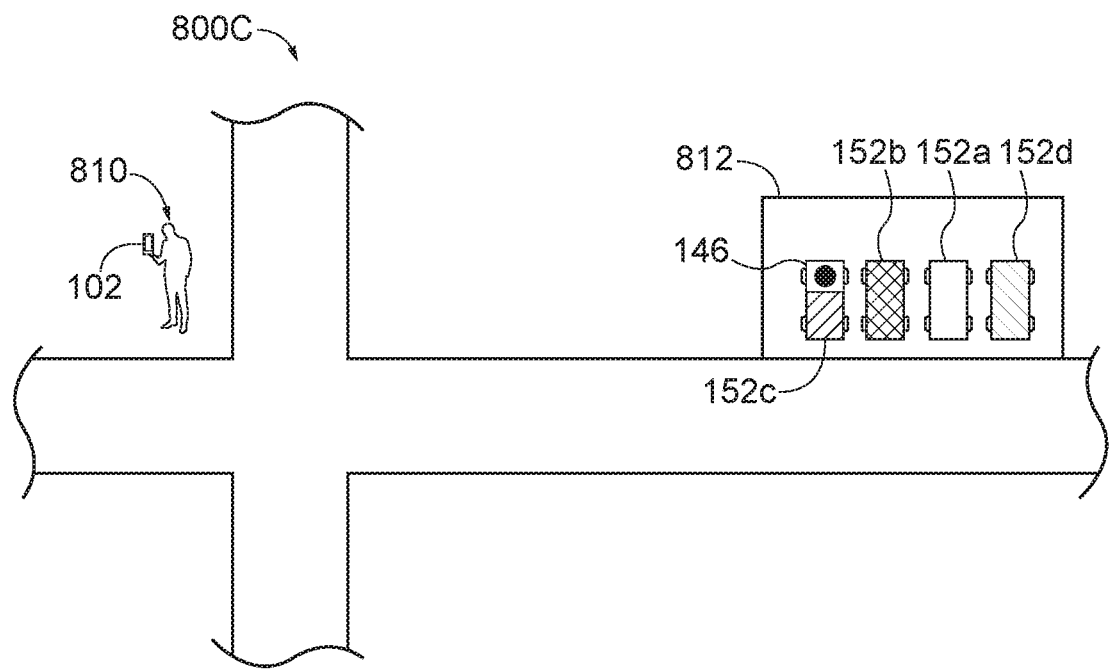
Figure 8D:
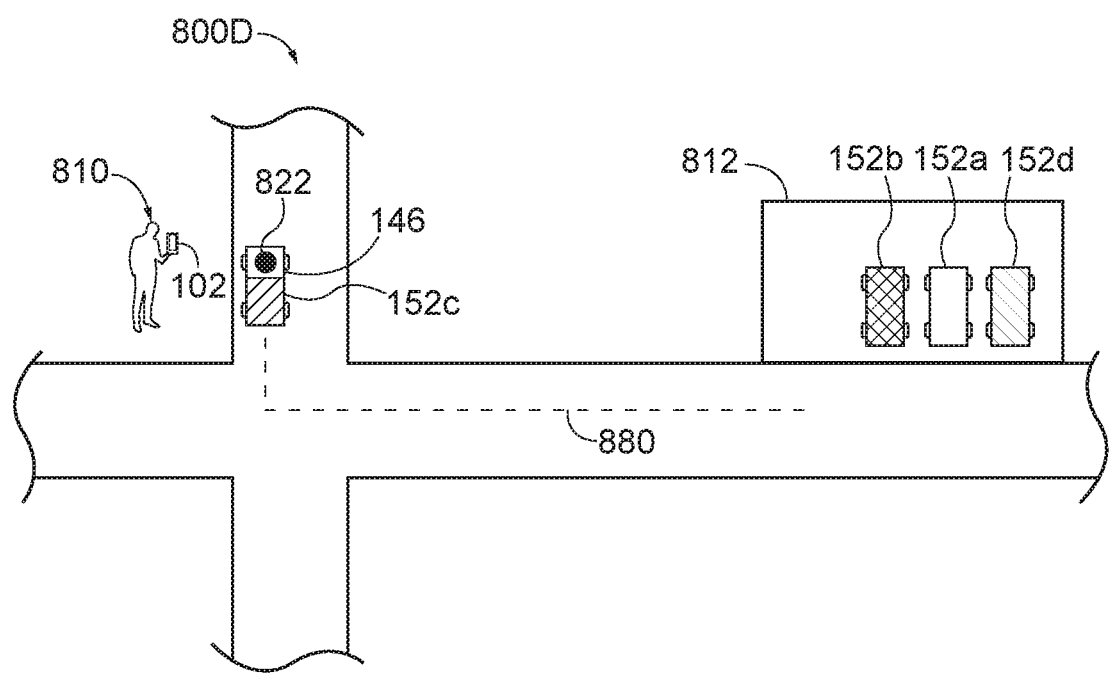

In FIG. 8C, the reconfiguration has been performed, and the selected interchangeable module (e.g., the third interchangeable module 152*c*) has been secured to the modularly reconfigurable vehicle in place of the first interchangeable module 152*a*. A second human driver 822 may begin navigation back to the user 810 or the location of the mobile device 102. The second human driver 822 may be the same or different than the first human driver 820 of FIGS. 8A-8B. Similarly to the first human driver 820, the second human driver 822 may also utilize the second mobile device 108, and receive navigation instructions from the server 110 from the current location of the second mobile device 108 to the location of the user 810 or the location of the first mobile device. In FIG. 8D, the modularly reconfigured vehicle may travel along a route 880 from the reconfiguration station 812 to the location of the user 810. According to other aspects, the modularly reconfigurable vehicle (including drive module 146) may be autonomously navigated, via the drive module 146 along the route 880 or the route 818, for example.

Figure 9A:
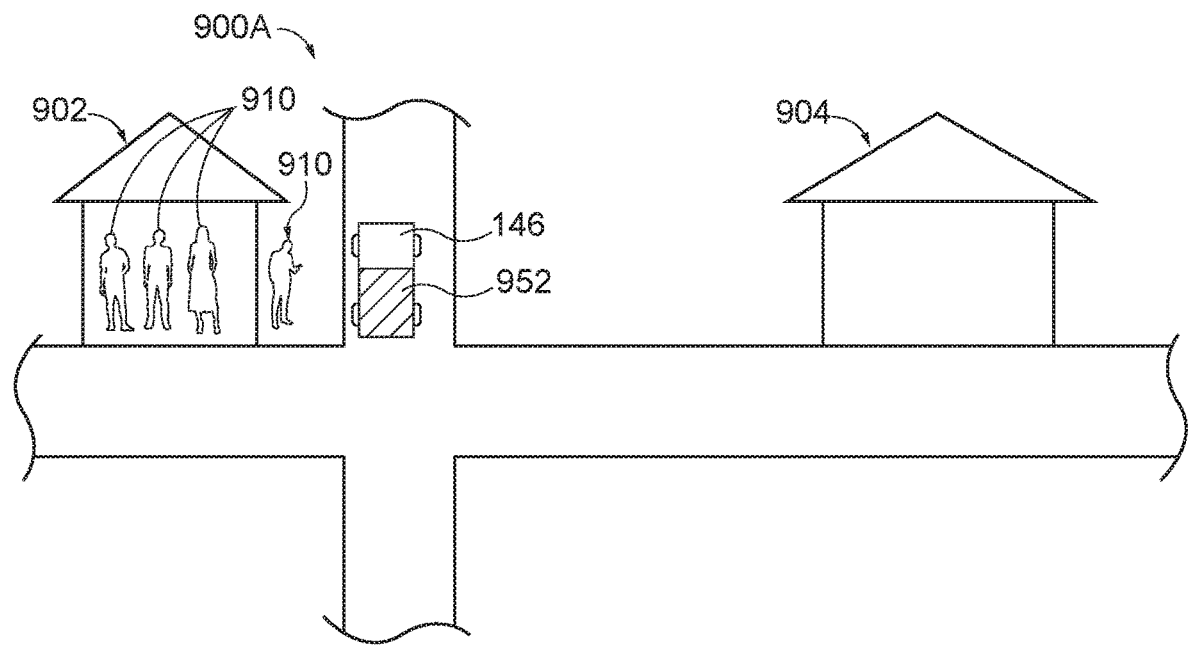
FIGS. 9A-9D are illustrations of exemplary scenarios associated with delivery of a modularly reconfigurable vehicle, according to one aspect.
Figure 9B:
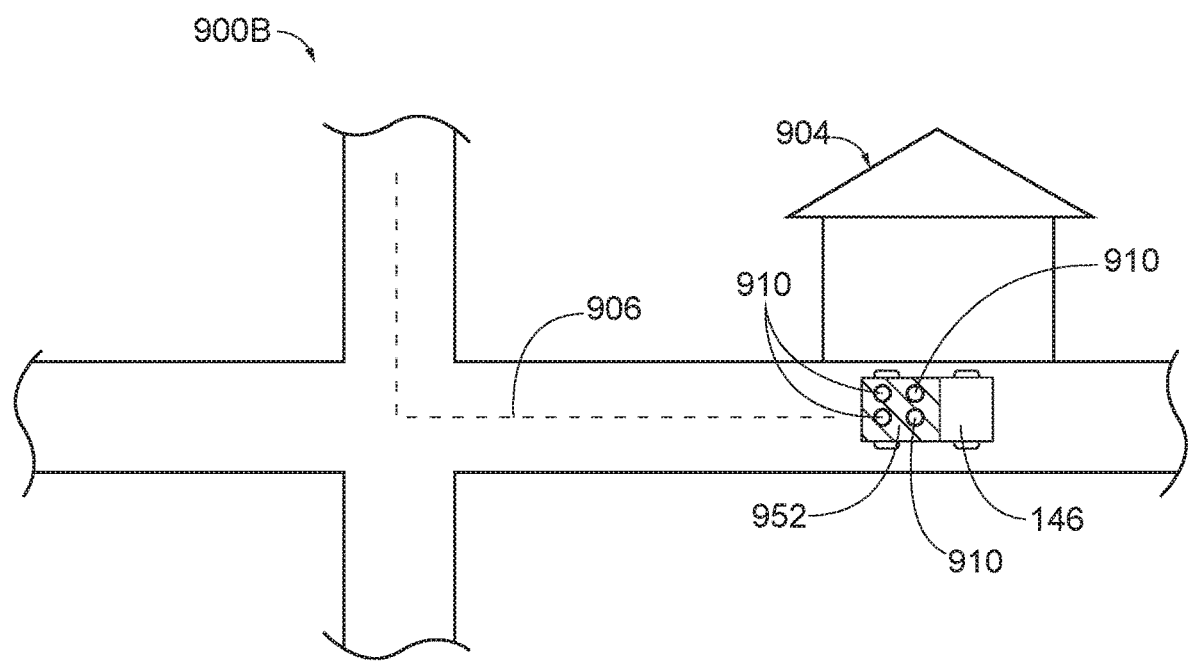
Figure 9C:
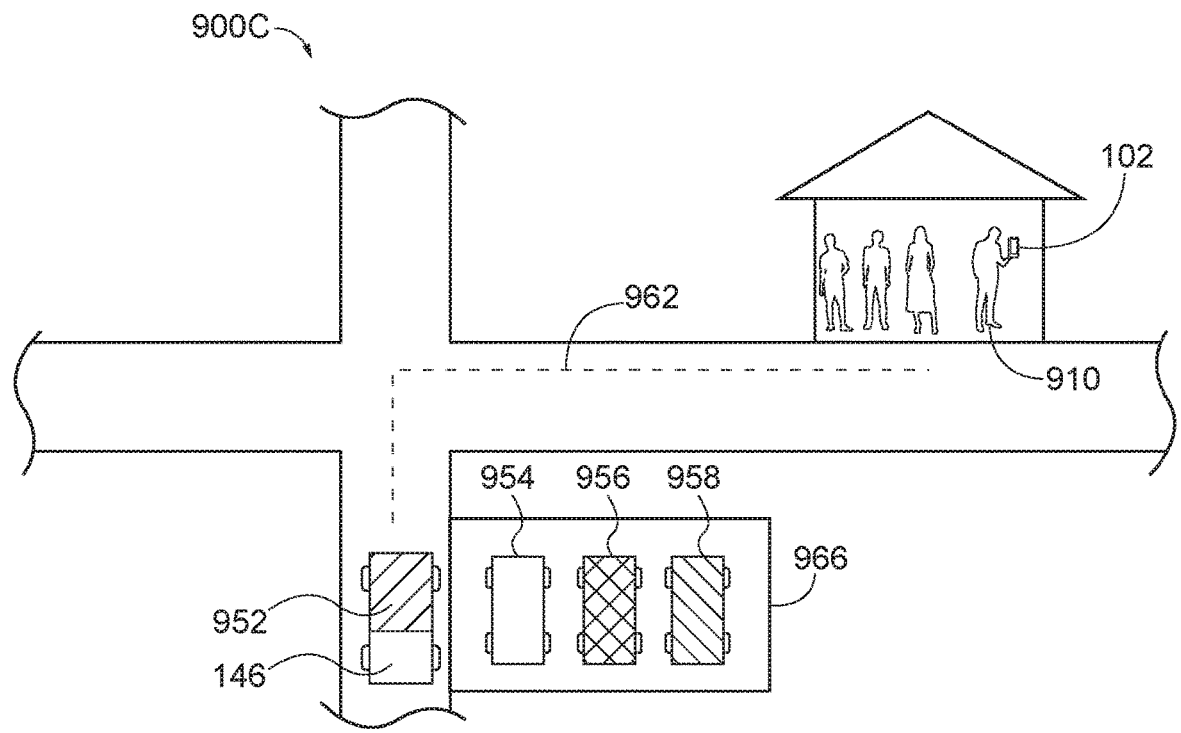
Figure 9D:
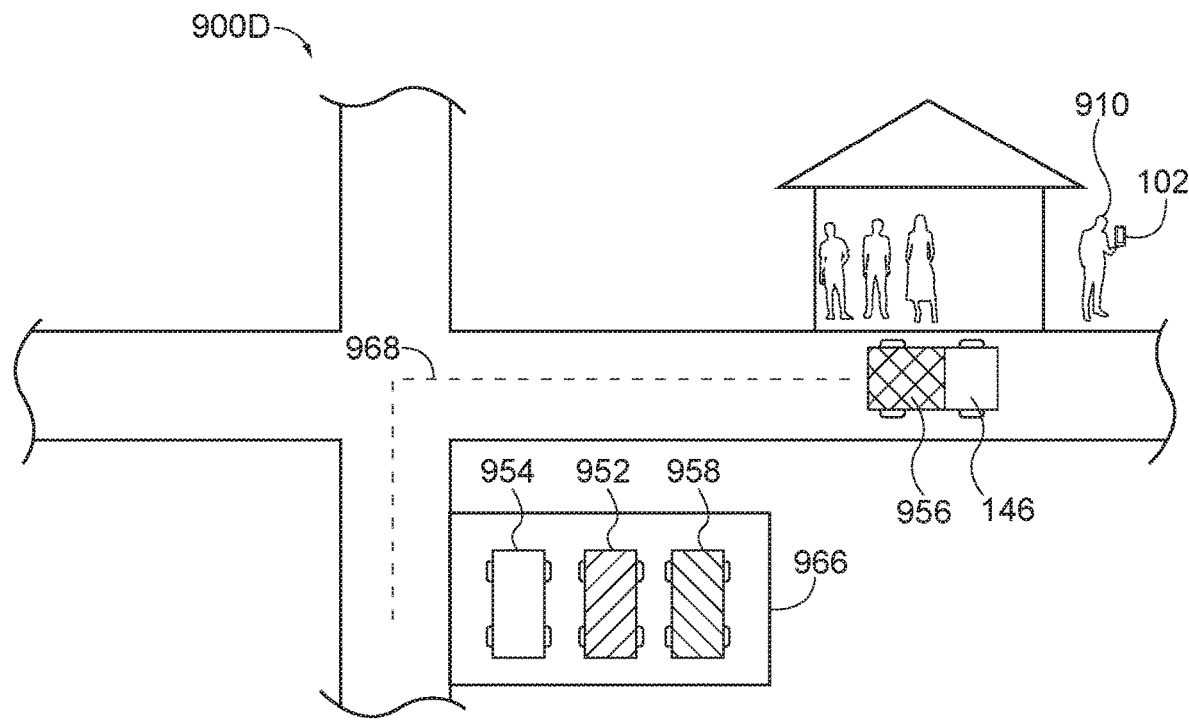

FIGS. 9A-9D are illustrations of exemplary scenarios 900A, 900B, 900C, 900D, respectively, associated with delivery of a modularly reconfigurable vehicle, according to one aspect. In FIG. 9A, a first location 902 and a second location 904 (e.g., destination) are depicted. One or more passengers 910 may take the modularly reconfigurable vehicle from the first location 902 to the second location 904. Here, the modularly reconfigurable vehicle may be equipped with a first interchangeable module 952. In FIG. 9B, the passengers 910 have arrived at the second location 904 along a route 906. In FIG. 9C, one of the passengers 910, using the mobile device 102, may place an order or request for a different interchangeable module. For example, the passenger 910 may request a second interchangeable module 954, a third interchangeable module 956, or a fourth interchangeable module 958. The modularly reconfigurable vehicle may proceed autonomously to the reconfiguration station 966 along a route 962 from the second location 904 to the reconfiguration station 966. If the passenger 910 selects the third interchangeable module 956, reconfiguration of the modularly reconfigurable vehicle may be performed at the reconfiguration station 966 to swap out the first interchangeable module 952 with the third interchangeable module 956. In FIG. 9D, the modularly reconfigured vehicle may be autonomously guided from the reconfiguration station 966 back to the location associated with the user or passenger along route 968, using the drive module 146, which may include a controller for autonomous operation.

Figure 10A:
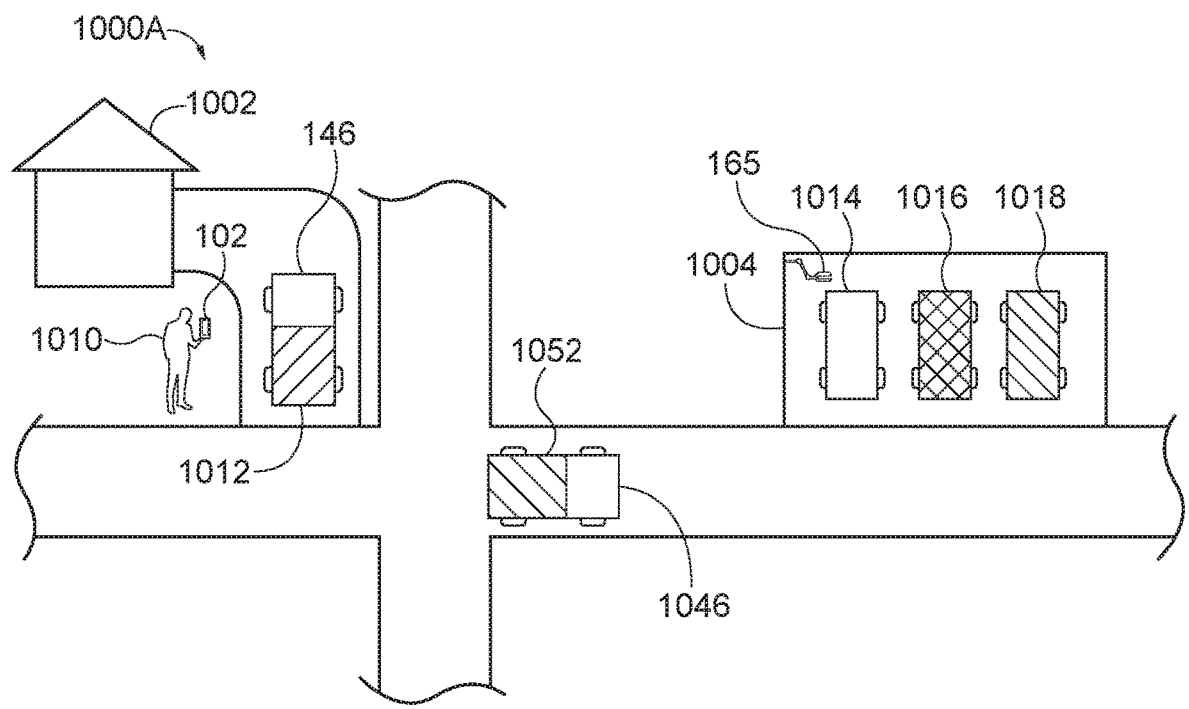
FIGS. 10A-10D are illustrations of exemplary scenarios associated with delivery of a modularly reconfigurable vehicle, according to one aspect.

FIGS. 10A-10D are illustrations of exemplary scenarios 1000A, 1000B, 1000C, 1000D, respectively, associated with delivery of a modularly reconfigurable vehicle, according to one aspect. In FIG. 10A, there is a first location 1002 and a reconfiguration station 1004. A user 1010 is located at the first location 1002 and may place a request for the modularly reconfigurable vehicle via the mobile device 102. In FIG. 10A, there is a modularly reconfigurable vehicle associated with the user's MaaS subscription, but in a configuration which may not be desired by the user 1010 at the time of the request. For example, the modularly reconfigurable vehicle having drive module 146 may be configured with a first interchangeable module 1012. In the request submitted by the user 1010 via the mobile device 102, the user 1010 may request a different interchangeable module, such as a second interchangeable module 1014, a third interchangeable module 1016, or a fourth interchangeable module 1018. In this regard, the mobile device 102 may transmit the request, including the desired configuration and the location associated with the request or the location of the user 1010 to the server 110.

Figure 10B:
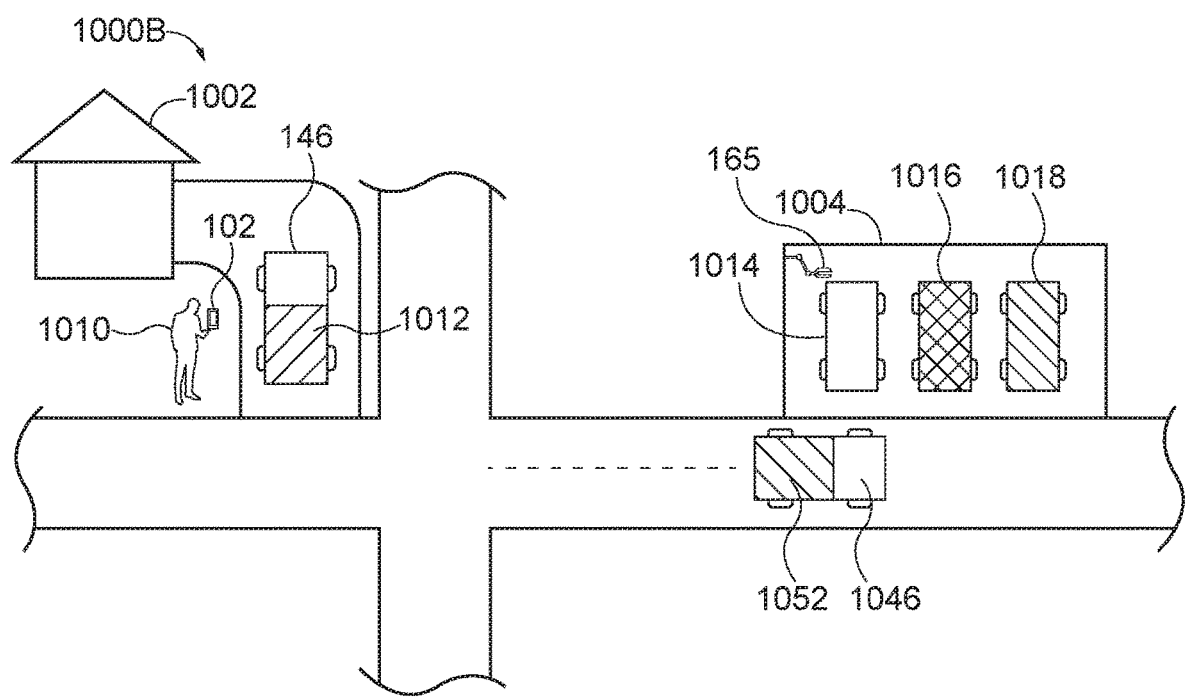
Figure 10C:
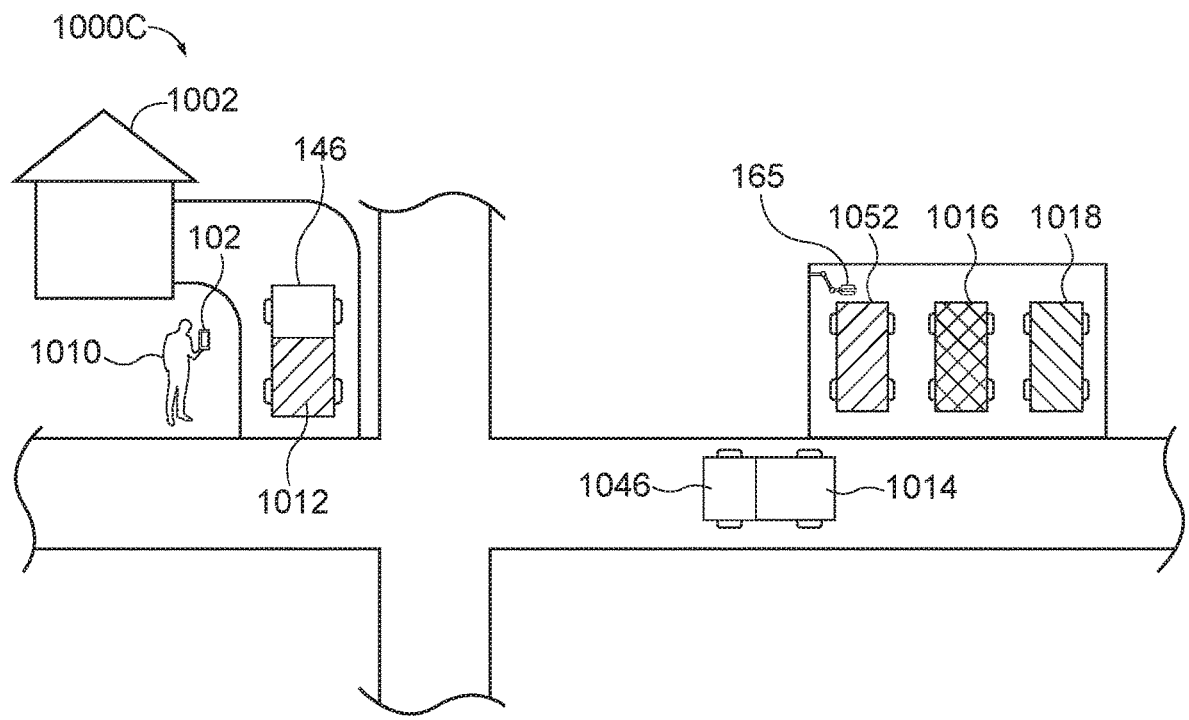
Figure 10D:
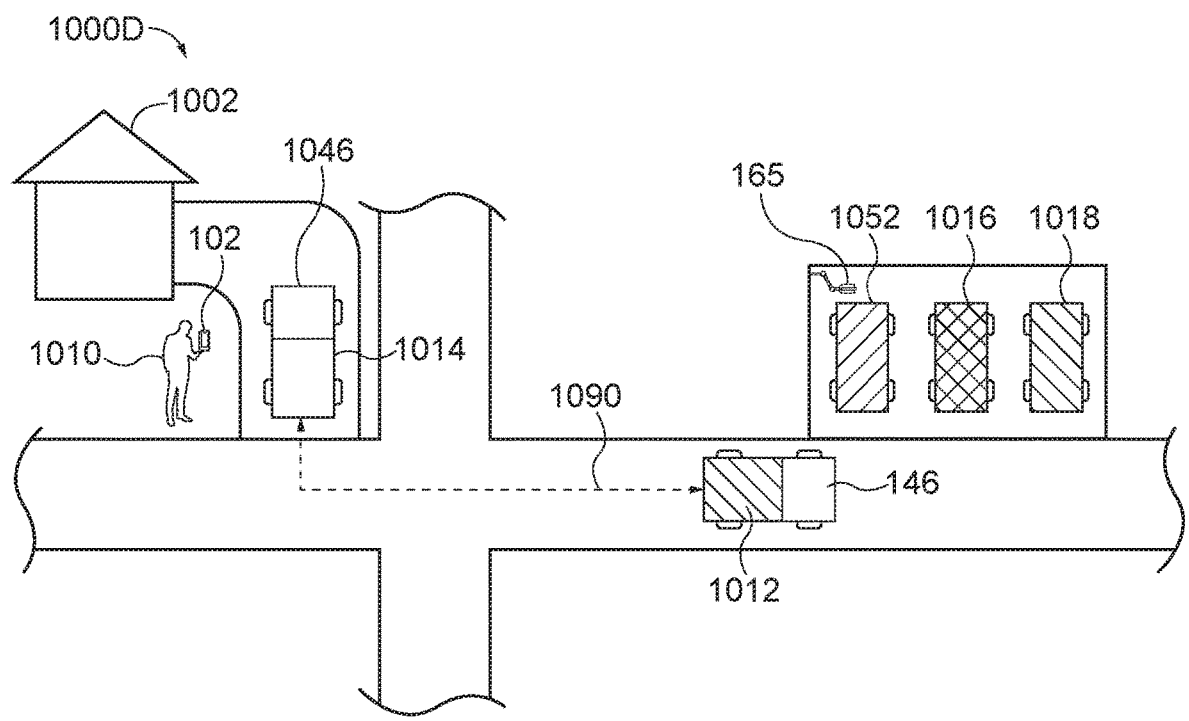

The server 110 may identify a modularly reconfigurable vehicle 1046, such as the modularly reconfigurable vehicle 1046 associated with a different interchangeable module 1052 and near a target reconfiguration station 1004. The server 110 may then provide this modularly reconfigurable vehicle 1046 with an instruction to travel to the target reconfiguration station 1004, which may be equipped to modify or reconfigure the modularly reconfigurable vehicle associated with the different interchangeable module 1052 according to the desired configuration of the second interchangeable module 1014. Thus, as seen in FIG. 10B, once the modularly reconfigurable vehicle 1046 arrives at the target reconfiguration station 1004, the server 110 may provide an instruction to the modification station device 106 to reconfigure the modularly reconfigurable vehicle 1046 according to the desired configuration as a modularly reconfigured vehicle. This modularly reconfigured vehicle 1046 may be seen at FIG. 10C, where the modularly reconfigured vehicle is equipped with the second interchangeable module 1014, and the old interchangeable module 1052 is left at the target reconfiguration station 1004.

In this regard, when the modularly reconfigured vehicle 1046 is reconfigured according to the desired configuration using the second interchangeable module 1014, the server 110 may provide an instruction to the modularly reconfigured vehicle 1046 to travel to the location 1002 associated with the request or to the user 1010. Additionally, the previously used modularly reconfigured vehicle having drive module 146 associated with the first interchangeable module 1012 may be sent to a predetermined location, such as to the reconfiguration station 1004. In FIGS. 10A-10D, the modularly configured vehicles having drive module 146, 1046 may travel autonomously between the first location 1002 and the reconfiguration station 1004 and/or vice versa, or along any other routes 1090 taken. According to other aspects, a human driver may manually drive the modularly configured vehicles between the different locations.

Figure 11:
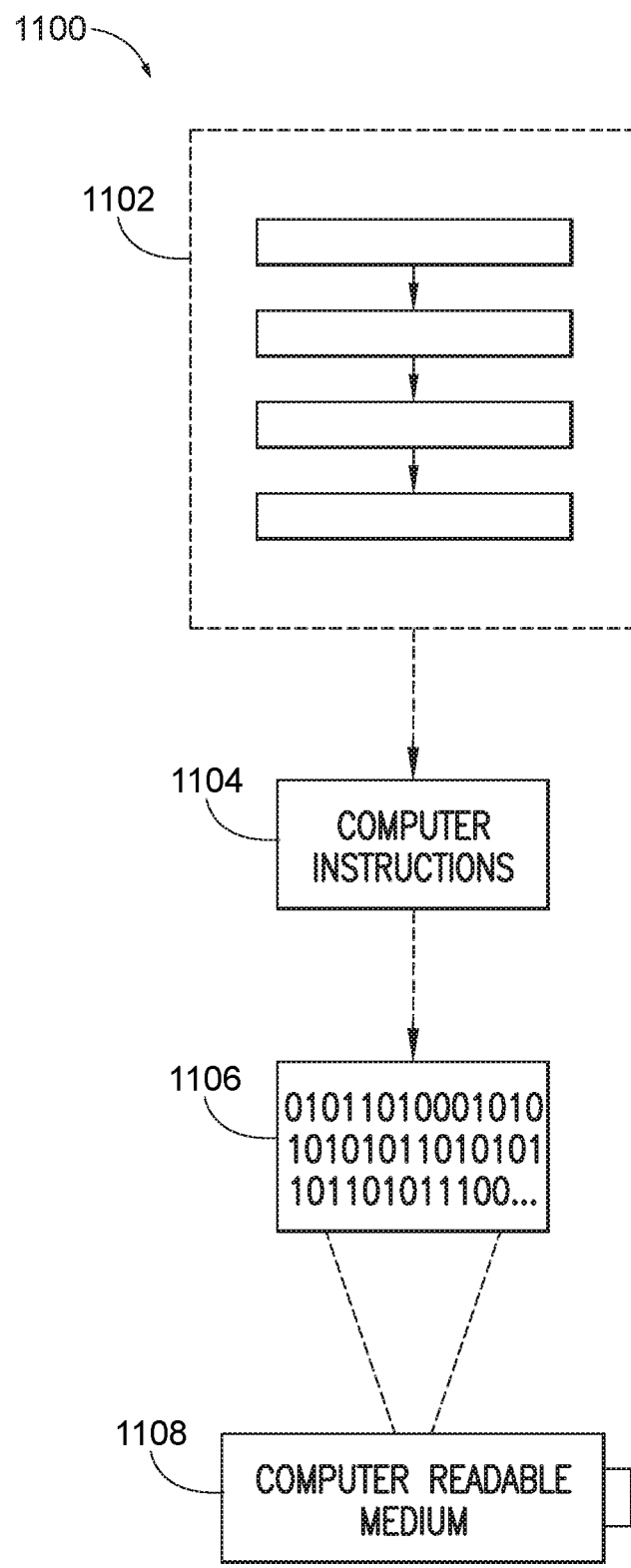
FIG. 11 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 11, wherein an implementation 1100 includes a computer-readable medium 1108, such as a CD-R, DVD-R, flash drive, a platter of a hard disk drive, etc., on which is encoded computer-readable data 1106. This encoded computer-readable data 1106, such as binary data including a plurality of zero's and one's as shown in 1106, in turn includes a set of processor-executable computer instructions 1104 configured to operate according to one or more of the principles set forth herein. In this implementation 1100, the processor-executable computer instructions 1104 may be configured to perform a method 1102, such as the method 200 of FIG. 2. In another aspect, the processor-executable computer instructions 1104 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 12:
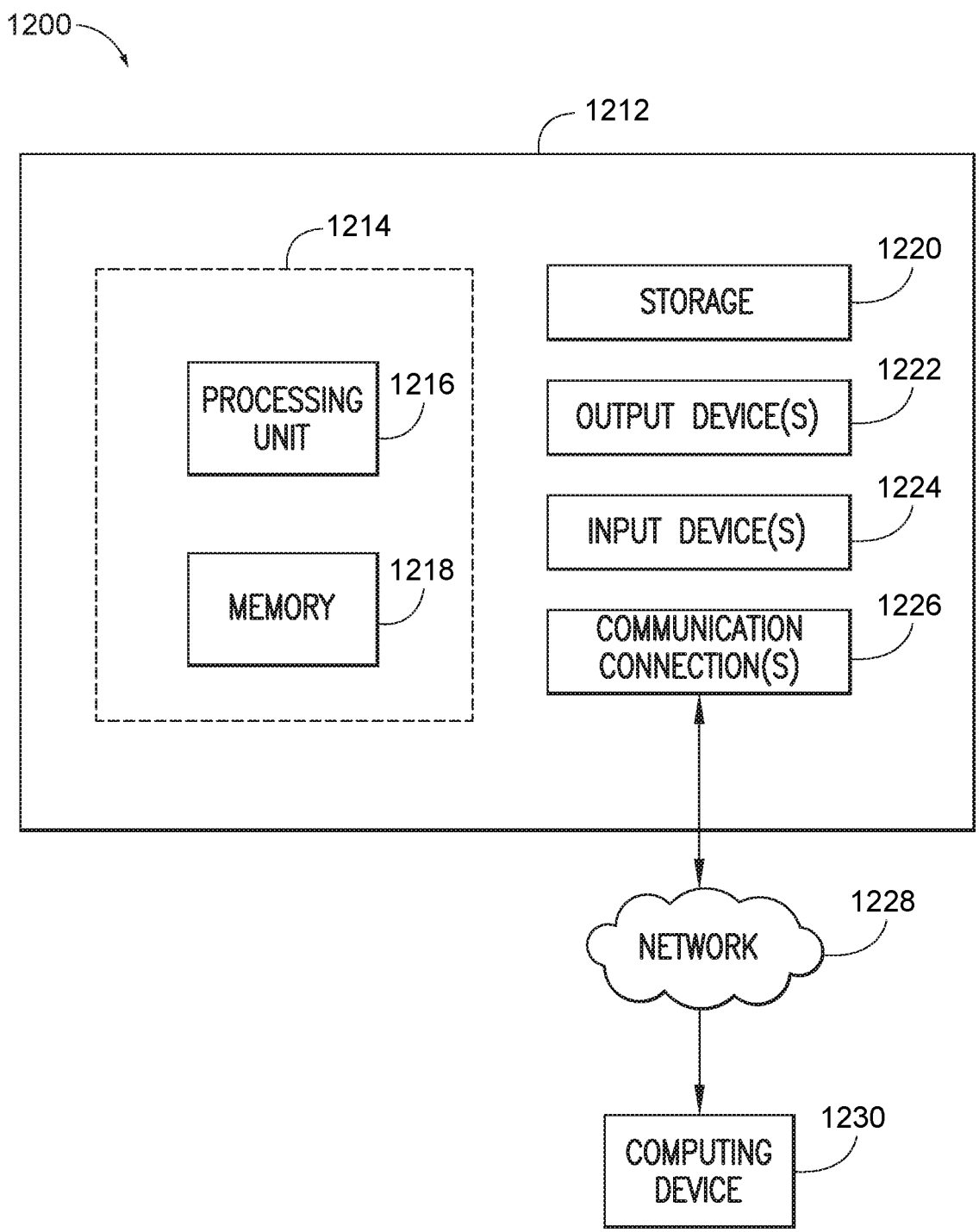
FIG. 12 is an illustration of an example computing environment where one or more of the provisions set forth herein are implemented, according to one aspect.

FIG. 12 and the following discussion provide a description of a suitable computing environment to implement aspects of one or more of the provisions set forth herein. The operating environment of FIG. 12 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 12 illustrates a system 1200 including a computing device 1212 configured to implement one aspect provided herein. In one configuration, the computing device 1212 includes at least one processing unit 1216 and memory 1218. Depending on the exact configuration and type of computing device, memory 1218 may be volatile, such as RAM, non-volatile, such as ROM, flash memory, etc., or a combination of the two. This configuration is illustrated in FIG. 12 by dashed line 1214.

In other aspects, the computing device 1212 includes additional features or functionality. For example, the computing device 1212 may include additional storage such as removable storage or non-removable storage, including, but not limited to, magnetic storage, optical storage, etc. Such additional storage is illustrated in FIG. 12 by storage 1220. In one aspect, computer readable instructions to implement one aspect provided herein are in storage 1220. Storage 1220 may store other computer readable instructions to implement an operating system, an application program, etc. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1212. Any such computer storage media is part of the computing device 1212.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1212 includes input device(s) 1224 such as keyboard, mouse, pen, voice input device, touch input device, infrared cameras, video input devices, or any other input device. Output device(s) 1222 such as one or more displays, speakers, printers, or any other output device may be included with the computing device 1212. Input device(s) 1224 and output device(s) 1222 may be connected to the computing device 1212 via a wired connection, wireless connection, or any combination thereof. In one aspect, an input device or an output device from another computing device may be used as input device(s) 1224 or output device(s) 1222 for the computing device 1212. The computing device 1212 may include communication connection(s) 1226 to facilitate communications with one or more other devices 1230, such as through network 1228, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for delivery of a modularly reconfigurable vehicle, comprising:
   receiving a request for the modularly reconfigurable vehicle, wherein the request includes a desired configuration associated with the modularly reconfigurable vehicle and a location associated with the request;
   identifying the modularly reconfigurable vehicle from a plurality of candidate modularly reconfigurable vehicles and a target reconfiguration station from a plurality of candidate reconfiguration stations;
   providing an instruction to the modularly reconfigurable vehicle to travel to the target reconfiguration station;
   upon the modularly reconfigurable vehicle reaching the target reconfiguration station, providing an instruction to reconfigure the modularly reconfigurable vehicle according to the desired configuration as a modularly reconfigured vehicle; and
   upon the modularly reconfigured vehicle being reconfigured according to the desired configuration, providing an instruction to the modularly reconfigured vehicle to travel to the location associated with the request.

2. The method for delivery of the modularly reconfigurable vehicle of claim 1, comprising upon the modularly reconfigured vehicle arriving at the location associated with the request, providing an instruction to a second modularly reconfigurable vehicle at the location associated with the request to travel to a predetermined location.

3. The method for delivery of the modularly reconfigurable vehicle of claim 1, comprising upon the modularly reconfigurable vehicle reaching the target reconfiguration station, reconfiguring the modularly reconfigurable vehicle according to the desired configuration as the modularly reconfigured vehicle.

4. The method for delivery of the modularly reconfigurable vehicle of claim 1, comprising determining the location associated with the request.

5. The method for delivery of the modularly reconfigurable vehicle of claim 1, comprising identifying a current configuration associated with each of the plurality of candidate modularly reconfigurable vehicles.

6. The method for delivery of the modularly reconfigurable vehicle of claim 1, comprising identifying the modularly reconfigurable vehicle from the plurality of candidate modularly reconfigurable vehicles based on a reconfiguration time associated with reconfiguring the modularly reconfigurable vehicle according to the desired configuration as the modularly reconfigured vehicle from a current configuration associated with respective plurality of candidate modularly reconfigurable vehicles.

7. The method for delivery of the modularly reconfigurable vehicle of claim 1, comprising identifying the modularly reconfigurable vehicle from the plurality of candidate modularly reconfigurable vehicles based on a distance or a travel time from a current position of respective plurality of candidate modularly reconfigurable vehicles to the target reconfiguration station.

8. The method for delivery of the modularly reconfigurable vehicle of claim 1, comprising identifying the target reconfiguration station based on a distance or a travel time from respective candidate reconfiguration stations to the location associated with the request.

9. The method for delivery of the modularly reconfigurable vehicle of claim 1, reconfiguring the modularly reconfigurable vehicle as the desired configuration includes reconfiguration using an office module, a camping module, a recreation or sports module, a power-sports module, a limo or shuttle module, an e-commerce module, a mobile charger exchange module, or a short stay or hotel module.

10. The method for delivery of the modularly reconfigurable vehicle of claim 1, wherein in response to receiving the instruction to travel to the location associated with the request, the modularly reconfigured vehicle autonomously navigates to the location associated with the request.

11. A system for delivery of a modularly reconfigurable vehicle, comprising a processor performing:
   receiving a request for the modularly reconfigurable vehicle, wherein the request includes a desired configuration associated with the modularly reconfigurable vehicle and a location associated with the request;

identifying the modularly reconfigurable vehicle from a plurality of candidate modularly reconfigurable vehicles and a target reconfiguration station from a plurality of candidate reconfiguration stations;

providing an instruction to the modularly reconfigurable vehicle to travel to the target reconfiguration station;

upon the modularly reconfigurable vehicle reaching the target reconfiguration station, providing an instruction to reconfigure the modularly reconfigurable vehicle according to the desired configuration as a modularly reconfigured vehicle; and upon the modularly reconfigured vehicle being reconfigured according to the desired configuration, providing an instruction to the modularly reconfigured vehicle to travel to the location associated with the request.

12. The system for delivery of the modularly reconfigurable vehicle of claim 11, wherein the modularly reconfigurable vehicle includes a drive module, a shell module, and an interchangeable module.

13. The system for delivery of the modularly reconfigurable vehicle of claim 12, wherein the interchangeable module includes an office module, a camping module, a recreation or sports module, a power-sports module, a limo or shuttle module, an e-commerce module, a mobile charger exchange module, or a short stay or hotel module.

14. The system for delivery of the modularly reconfigurable vehicle of claim 12, wherein the drive module includes an autonomous drive controller autonomously navigating the modularly reconfigurable vehicle from a current position to the location associated with the request.

15. A system for delivery of a modularly reconfigurable vehicle, comprising a processor performing:

receiving a request for the modularly reconfigurable vehicle, wherein the request includes a desired configuration associated with the modularly reconfigurable vehicle and a location associated with the request;

identifying the modularly reconfigurable vehicle from a plurality of candidate modularly reconfigurable vehicles and a target reconfiguration station from a plurality of candidate reconfiguration stations;

providing an instruction to the modularly reconfigurable vehicle to travel to the target reconfiguration station;

upon the modularly reconfigurable vehicle reaching the target reconfiguration station, providing an instruction to reconfigure the modularly reconfigurable vehicle according to the desired configuration as a modularly reconfigured vehicle;

upon the modularly reconfigured vehicle being reconfigured according to the desired configuration, providing an instruction to the modularly reconfigured vehicle to travel to the location associated with the request; and upon the modularly reconfigured vehicle arriving at the location associated with the request, providing an instruction to a second modularly reconfigurable vehicle at the location associated with the request to travel to a predetermined location.

16. The system for delivery of the modularly reconfigurable vehicle of claim 15, wherein the processor determines the location associated with the request.

17. The system for delivery of the modularly reconfigurable vehicle of claim 15, wherein the processor receives a current configuration associated with each of the plurality of candidate modularly reconfigurable vehicles.

18. The system for delivery of the modularly reconfigurable vehicle of claim 15, wherein the processor identifies the modularly reconfigurable vehicle from the plurality of candidate modularly reconfigurable vehicles based on a reconfiguration time associated with reconfiguring the modularly reconfigurable vehicle according to the desired configuration as the modularly reconfigured vehicle from a current configuration associated with respective plurality of candidate modularly reconfigurable vehicles.

19. The system for delivery of the modularly reconfigurable vehicle of claim 15, wherein the processor identifies the modularly reconfigurable vehicle from the plurality of candidate modularly reconfigurable vehicles based on a distance or a travel time from a current position of respective plurality of candidate modularly reconfigurable vehicles to the target reconfiguration station.

20. The system for delivery of the modularly reconfigurable vehicle of claim 15, wherein the processor identifies the target reconfiguration station based on a distance or a travel time from respective candidate reconfiguration stations to the location associated with the request.

* * * * *